(12) United States Patent
Aguilar et al.

(10) Patent No.: US 6,490,677 B1
(45) Date of Patent: Dec. 3, 2002

(54) METHOD AND SYSTEM FOR AUTOMATICALLY CONFIGURING THE BOOT PROCESS OF A COMPUTER HAVING MULTIPLE BOOTSTRAP PROGRAMS WITHIN A NETWORK COMPUTER SYSTEM

(75) Inventors: Maximino Aguilar, Austin, TX (US); Norbert Blam, Austin, TX (US); Yuan-Chang Lo, Austin, TX (US); James Michael Stafford, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/397,609

(22) Filed: Sep. 16, 1999

(51) Int. Cl.[7] .......................... G06F 15/177; G06F 9/00
(52) U.S. Cl. ................................. 713/1; 710/8
(58) Field of Search .............................. 713/1, 2; 710/8

(56) References Cited

U.S. PATENT DOCUMENTS

| | | | | |
|---|---|---|---|---|
| 5,261,052 A | * | 11/1993 | Shimamoto et al. | 709/206 |
| 5,668,952 A | * | 9/1997 | Slane | 340/825.52 |
| 5,870,554 A | * | 2/1999 | Grossman et al. | 709/221 |
| 5,872,968 A | * | 2/1999 | Knox et al. | 709/222 |
| 5,974,547 A | * | 10/1999 | Klimenko | 709/219 |
| 6,154,743 A | * | 11/2000 | Leung et al. | 707/10 |

OTHER PUBLICATIONS

R. Droms; Bucknell University; Mar. 1997; "Dynamic Host Configuration Protocol".

* cited by examiner

Primary Examiner—Thomas Lee
Assistant Examiner—James K. Trujillo
(74) Attorney, Agent, or Firm—J. Bruce Schelkopf; John David Flynn; Bracewell & Patterson, LLP (57) ABSTRACT

A method and system for automatically configuring a boot process of a network computer initially connected within a network comprising at least one server. A request is broadcast from a network computer to a network for an available server, upon a first initiation of the network computer within the network. Responses from the broadcast are gathered which indicate whether a server is available. A selected boot program is then executed from among multiple boot programs available in the network computer. The selected boot program and the identity of an available server are stored as boot process configuration settings in a nonvolatile storage of the network computer, in response to successful execution of the boot program, such that a subsequent boot process of a network computer is automatically configured.

24 Claims, 5 Drawing Sheets

METHOD AND SYSTEM FOR AUTOMATICALLY CONFIGURING THE BOOT PROCESS OF A COMPUTER HAVING MULTIPLE BOOTSTRAP PROGRAMS WITHIN A NETWORK COMPUTER SYSTEM

BACKGROUND OF THE INVENTION

1. Technical Field

The present invention relates in general to a method and system for data processing and, in particular, to a method and system for automatically configuring the boot process of a network computer. Still more particularly, the present invention relates to a method and system for automatically configuring the boot program and server utilized in the boot process of a network computer upon first initiation of the network computer within a network such that for subsequent initiations of the network computer within the network a particular boot program and server are already selected.

2. Description of the Related Art

A typical data processing system, for example a general-purpose computer, consists of a central processing unit (CPU), memory components, and a number of device controllers that are typically connected through a system of buses that provides access to all shared memory. Each device controller is devoted to control of a specific type of device (e.g. disk drives, audio devices, and video displays). The CPU and device controllers can execute concurrently, competing for memory cycles. To ensure orderly access to the shared memory, a memory controller is typically provided whose function is to synchronize access to the memory. a computer to start running, for instance upon power up or reboot, an initial program in necessary. This initial program, or bootstrap program, is typically simple. Preferably, the bootstrap program initializes all aspects of the data processing system, from CPU registers to device controllers to memory contents. The bootstrap program must know how to load an operating system and to start execution of the operating system. To load the operating system, the bootstrap program typically locates an operating system kernel, loaded into memory, and jumps to an initial address provided by the operating system kernel. Typically, the operating system is loaded into random-access memory (RAM) within the data processing system. Once loaded and initialized, the operating system controls the execution of programs and may provide services such as resource allocation, scheduling, input/output control, and data management. The operating system also determines the graphical user interface (GUI) provided for displaying data.

In most data processing systems, the bootstrap program is stored in two places. First, part of the bootstrap program may be stored in read-only memory (ROM). ROM is an ideal memory location because the ROM does not require initialization and is always available. However, the part of the bootstrap program stored in ROM is not configurable. Therefore, the configurable aspects of the bootstrap program are preferably stored at a fixed memory location available to the data processing system. The ROM contains instructions to access the part of the bootstrap program stored at a fixed memory location and loads the data into main memory. The location of an operating system kernel is preferably a configurable aspect of the bootstrap program whereby a data processing system is not limited to storage of operating system software at a fixed location.

In the evolution of network computers, the operating system kernel may be located in a server accessible within a network. Preferably, the bootstrap program is located within the fixed memory of the network computer, however, the operating system software is loaded from the server to the RAM of the network computer. In this manner, to update the operating system software, only the server software is updated. All other network computers accessing the server will receive the updated version during the boot process.

With the evolution of networks, multiple operating systems have been developed for storage on servers within the network. Bootstrap programs for loading each of the multiple operating systems have also been developed. Therefore, it is typical for a network computer to be factory loaded with multiple bootstrap programs available for configuration.

While factory loading of multiple bootstrap programs onto network computers provides for diversity of operating systems, configuration of the boot process of each network computer when initiated onto a network is required to direct the bootstrap program to the correct operating system kernel on a server and to set the correct bootstrap program for loading the operating system.

However, it would be desirable for a network computer, upon initiation to a network, to automatically configure the network computer's boot process from the operating systems available on the network. Further, it would be desirable in cases where the user prefers a particular operating system to reduce the user steps necessary to configure a network computer for that operating system.

SUMMARY OF THE INVENTION

In view of the foregoing, it is therefore an object of the present invention to provide an improved method and system for data processing.

It is another object of the present invention to provide an improved method and system for automatically configuring the boot process of a network computer.

It is further an object of the present invention to provide an improved method and system for automatically configuring the boot program and server utilized in the boot process of a network computer upon first initiation of the network computer within a network such that for subsequent initiations of the network computer within the network a particular boot program and server are already selected.

In accordance with the method and system of the present invention, a request is broadcast from a network computer to a network for an available server, upon a first initiation of the network computer within the network. Responses from the broadcast are gathered which indicate whether a server is available. A selected boot program is then executed from among multiple boot programs available in the network computer, in response to gathering a response indicating an available server, where the selected boot program correlates with an operating system of the available server. The selected boot program and the identity of the available server are stored as boot process configuration settings in a nonvolatile storage of the network computer, in response to successful execution of the boot program, such that a boot process of a network computer is automatically configured upon a first initiation thereof such that for subsequent initiations of the network computer within the network a boot program and particular server are already selected for the boot process of the network computer.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF A PREFERRED EMBODIMENT

The present invention may be executed in a variety of computers under a number of different bootstrap programs and operating systems. The computer may be, for example, a personal computer, a midrange computer, a network computer or a mainframe computer. In addition, the computer may be a stand-alone system or part of a network such as a local-area network (LAN) or a wide-area network (WAN). For the purposes of illustration, a preferred embodiment of the present invention, as described below, is implemented on a network computer, such as the IBM Network Station manufactured by International Business Machines Corporation. In particular, network computers typically perform part of the booting process over a network, as will be further described.

Figure 1:
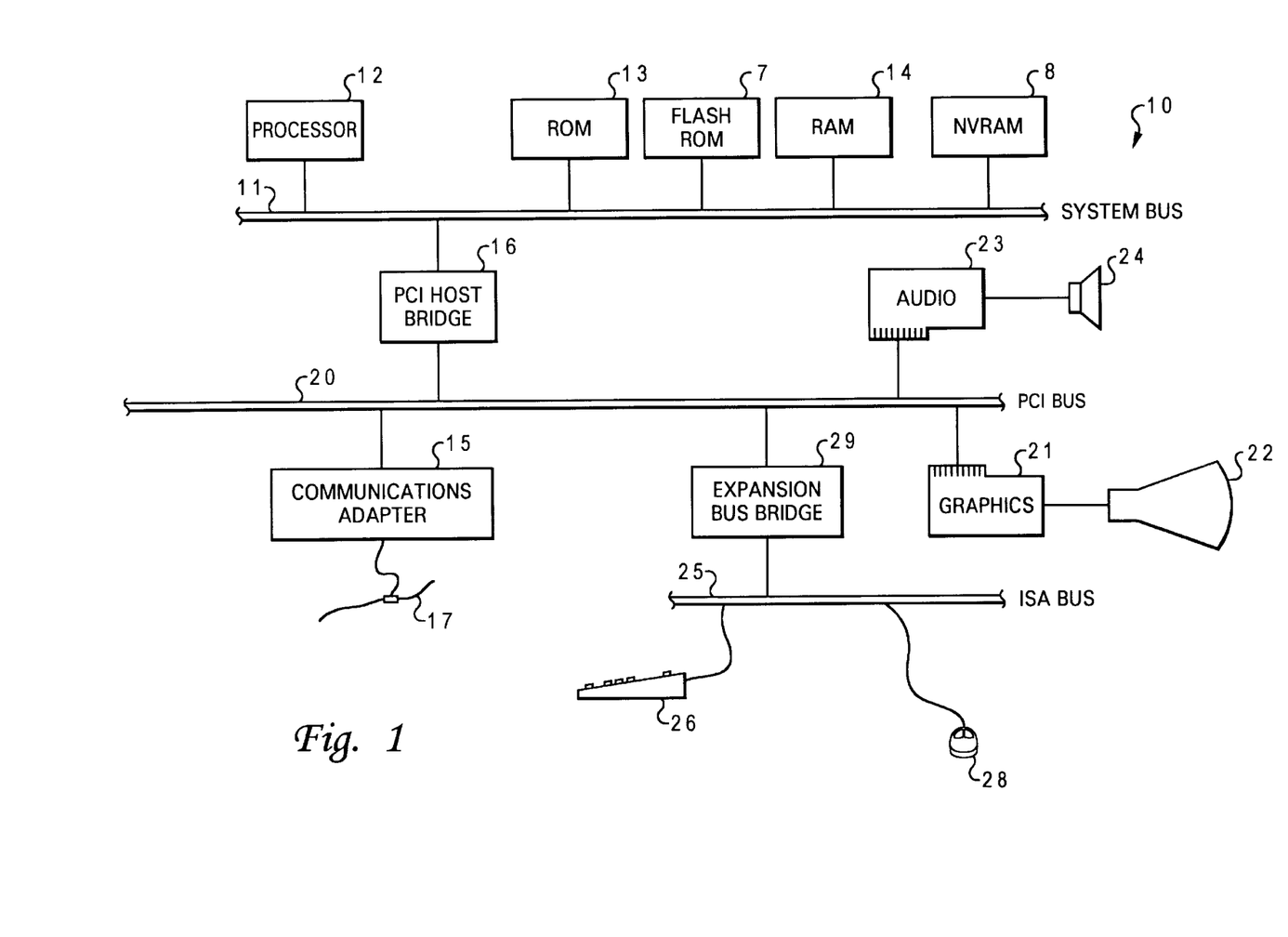
FIG. 1 depicts a block diagram of a typical computer system that may utilize a preferred embodiment of the present invention.

Referring now to the drawings and in particular to FIG. 1, there is depicted a block diagram of a typical network computer system that may utilize a preferred embodiment of the present invention. As shown, a central processing unit (CPU) 12, a read-only memory (ROM) 13, a Random-Access Memory (RAM) 14 and a non-volatile RAM (NVRAM) 8 are connected to a system bus 11 of a network computer system 10. CPU 12, ROM 13, RAM 14 and NVRAM 8 are also coupled to a peripheral component interface (PCI) local bus 20 of network computer system 10 through a PCI host bridge 16. PCI host bridge 16 provides a low latency path through which processor 12 may directly access PCI devices mapped anywhere within bus memory and/or input/output (I/O) address spaces. PCI host bridge 16 also provides a high bandwidth path for allowing PCI devices to directly access RAM 14.

Also attaching to PCI local bus 20 are communications interface 15 and expansion bus bridge 45.

Communications interface 15 is for connecting network computer system 10 to a network 17. Expansion bus bridge 45, such as a PCI-to-industry standard architecture(ISA) bus bridge, may be utilized for coupling ISA bus 25 to PCI local bus 20. As shown, a keyboard 26 and a mouse 28 are attached to ISA bus 25 for performing certain basic I/O functions. In addition, an audio adapter 23 is attached to PCI local bus 20 for controlling audio output through speaker 24. A graphics adapter 21 is also attached to PCI local bus 20 for controlling visual output through display monitor 22.

A boot process for network computer system 10 typically includes executing a bootstrap program which performs system initialization and loads an operating system by locating and implementing an operating system kernel from a server within network 17. Utilizing the operating system kernel as a locating device, the bootstrap program loads the operating system, preferably into RAM 14, and initializes operation thereby. The terms "boot program" and "bootstrap program" may be utilized interchangeably herein.

By the present invention, preferably an initial bootstrap program is stored in ROM 13 which determines which of multiple bootstrap programs stored in flash ROM 7 to execute. Further portions of the bootstrap program may also be stored in any other suitable machine-readable media such as NVRAM 8, RAM 14, and other disk and/or tape drive (e.g. magnetic diskette, magnetic tape, CD-ROM, optical disk, or other suitable storage media). While ROM 13 contains static boot programs, NVRAM 8 preferably contains configurable settings for the boot program to utilize. For example, preferably stored in NVRAM 8 is the location of the desired operating system kernel, which may be reconfigured. Any suitable machine-readable media may retain the operating system kernel and associated operating system(OS), such as RAM 14, ROM 13, and other disk and/or tape drive(e.g. magnetic diskette, magnetic tape, CD-ROM, optical disk, or other suitable storage media). Further, as previously described, computer system 10 is preferably a network computer may access the operating system kernel and associated operating system from other machine-readable media accessible on network 17. Any suitable OS may direct CPU 12. For example, the AIX operating system is one of IBM's operating systems which is implemented.

Figure 2:
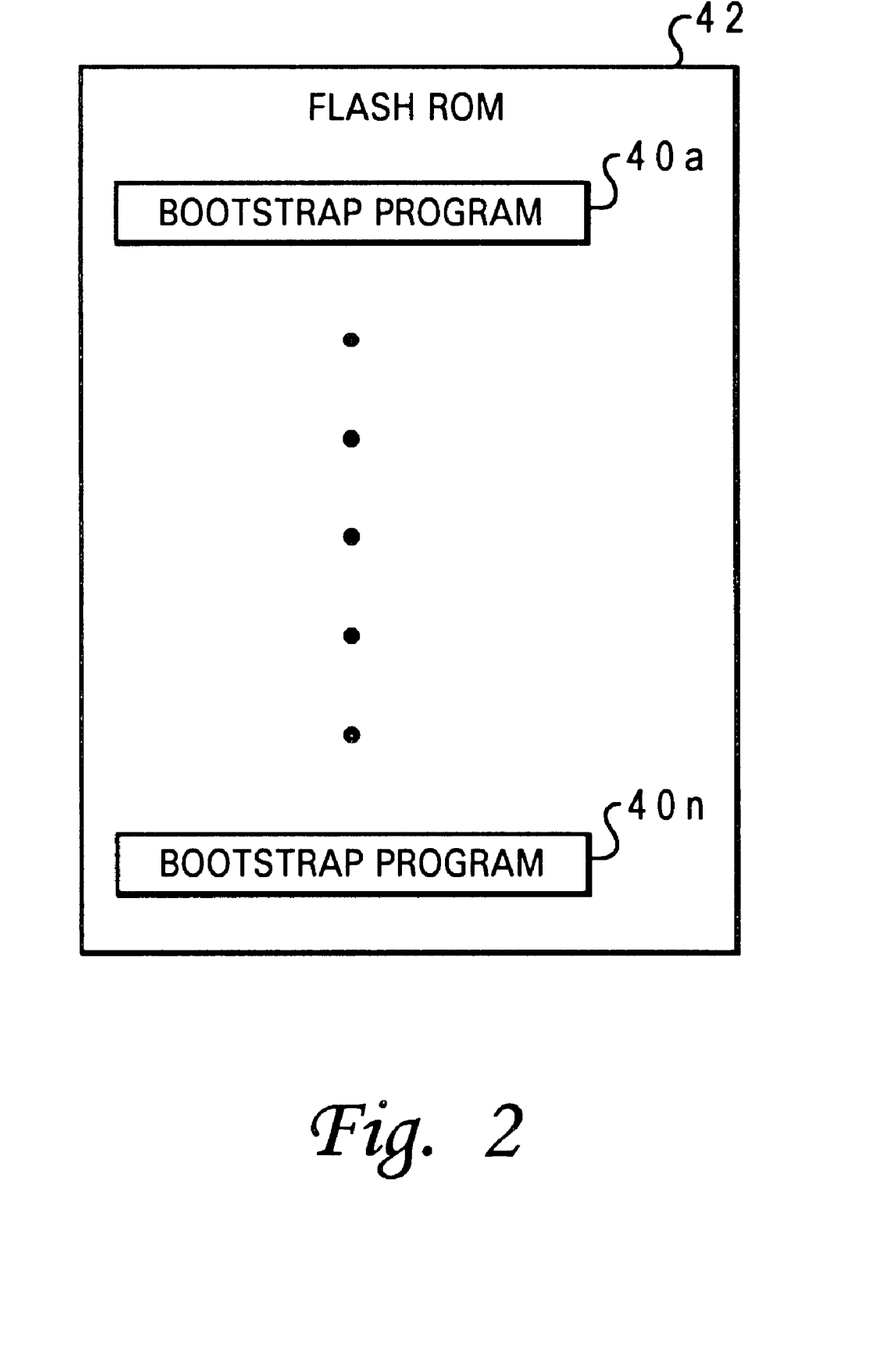
FIG. 2 illustrates a block diagram of multiple bootstrap programs within ROM of a network computer.

Referring now to FIG. 2, there is illustrated a block diagram of multiple bootstrap programs within flash ROM. Preferably, as depicted, multiple bootstrap programs 40a–40n are stored in an flash ROM 42 type of ROM, however in alternate embodiments bootstrap programs 40a–40n may be stored in alternate types of ROM.

When a network computer is initially installed on a WAN, a setting is determined indicating which of multiple bootstrap programs stored in flash ROM 42 to execute. Preferably, a basic input/output system (BIOS) based bootstrap program and a non-BIOS based bootstrap program are provided in flash ROM 7. BIOS based bootstrap programs support BIOS based operating systems. Non-BIOS based bootstrap programs support non-BIOS based operating systems.

Figure 3:
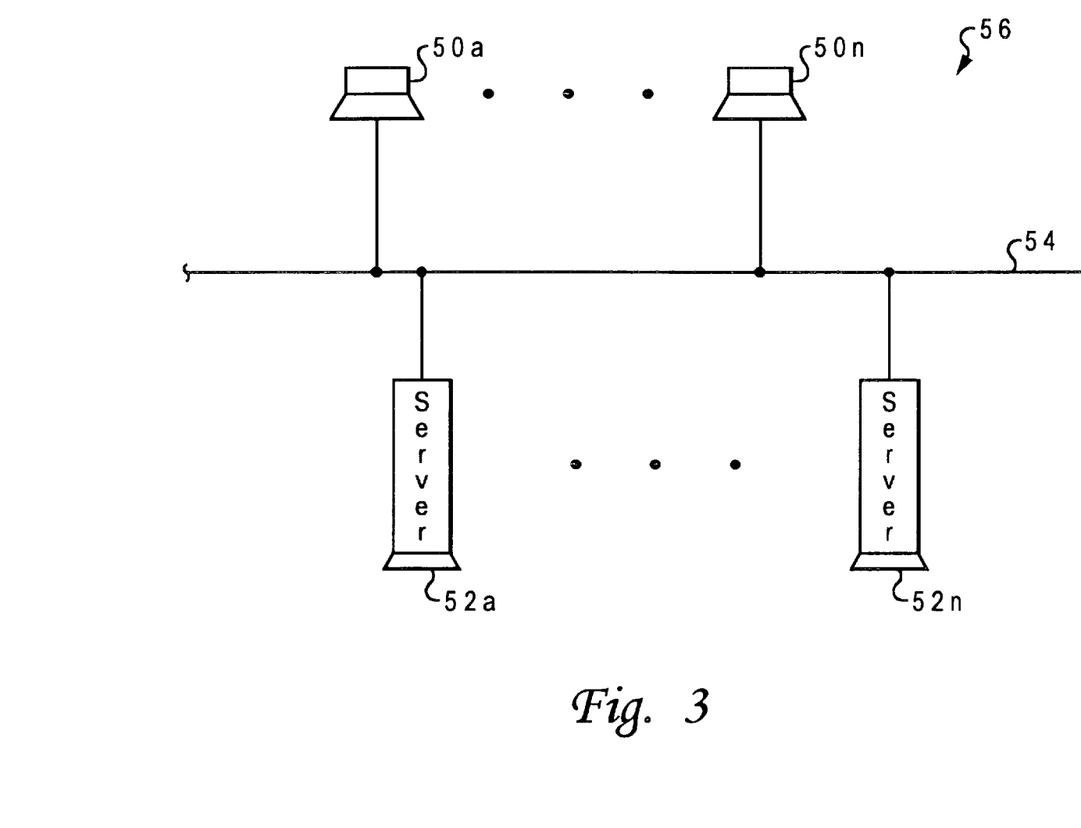
FIG. 3 depicts a block diagram of a network system according to the method and system of the present invention.

With reference now to FIG. 3, there is depicted a block diagram of a network system in accordance with the method and system of the present invention. Network system 56 includes multiple network computers 50a–50n, or clients, with access to multiple servers 52a–52n by network link 54. As described in FIG. 1, each network computer 50a–50n includes a communications adapter by which communication within the network system.

Each of network computers 50a–50n preferably access services and software, including an operating system, from at least one of servers 52a–52n. Preferably, the client-server network communicates utilizing the Dynamic Host Configuration Protocol (DHCP), including Preboot execution Environment (PXE) of Intel Corporation, Inc. and Remote Program Load (RPL). Alternative network arrangements may also be utilized for providing software to network computers, as will be appreciated by one skilled in the art. Further, additional components may be added to a network arrangement.

With respect to the present invention, as depicted in FIG. 2, each of network computers preferably 50a–50n includes multiple bootstrap programs stored in the flash ROM of each network computer 50a–50n. Further, each of servers 52a–52n preferably provides one of multiple available operating systems. When a network computer 50a–50n is initially placed on network link 54, the user may be prompted to select a desired operating system or default to the first available operating system. The newly placed network computer, through a sequence of automatic operations, searches the network for an available server containing the desired operating system or default. Once detected, a particular bootstrap program (either BIOS or non-BIOS) and an operating system kernel located within a particular server are stored as part of the boot process configuration, preferably in NVRAM of the network computer. By storing the selected bootstrap program and identity of the server storing the operating system kernel, if rebooted, the network computer is configured to automatically choose the selected bootstrap program and access the selected operating system at the location of the operating system kernel.

In particular, in utilizing the DHCP protocol, a network computer may broadcast a DHCP request for a server connection to each of servers 52a–52n. Any servers which can provide service to the requesting network computer returns a DHCP DISCOVER protocol response. From each response, the type of OS provided by the server can be determined. For example, a DHCP response may indicate a PXE type server and the address thereof, indicating that the server is prepared to supply the next bootstrap service (e.g. delivery of an operating system executable image or operating system kernel). Since PXE type servers provide a BIOS based OS, the BIOS bootstrap program with the address provided by the server are utilized to boot the OS. If successful, the configuration settings in NVRAM are changed to utilize the successful boot settings. However, if a non-PXE DHCP response and an address are returned with the protocol response, the non-BIOS based bootstrap program and address will be utilized to perform the boot and if successful configured in NVRAM. If there is not a DHCP response to the DHCP broadcast request, an RPL Find Frame request will be broadcast. If there is a response to the RPL Find Frame request, the system will reboot with the BIOS bootstrap program and attempt to boot the OS. If the boot is successful, the BIOS bootstrap program will be configured in NVRAM for use with all future boots.

Figure 4A:
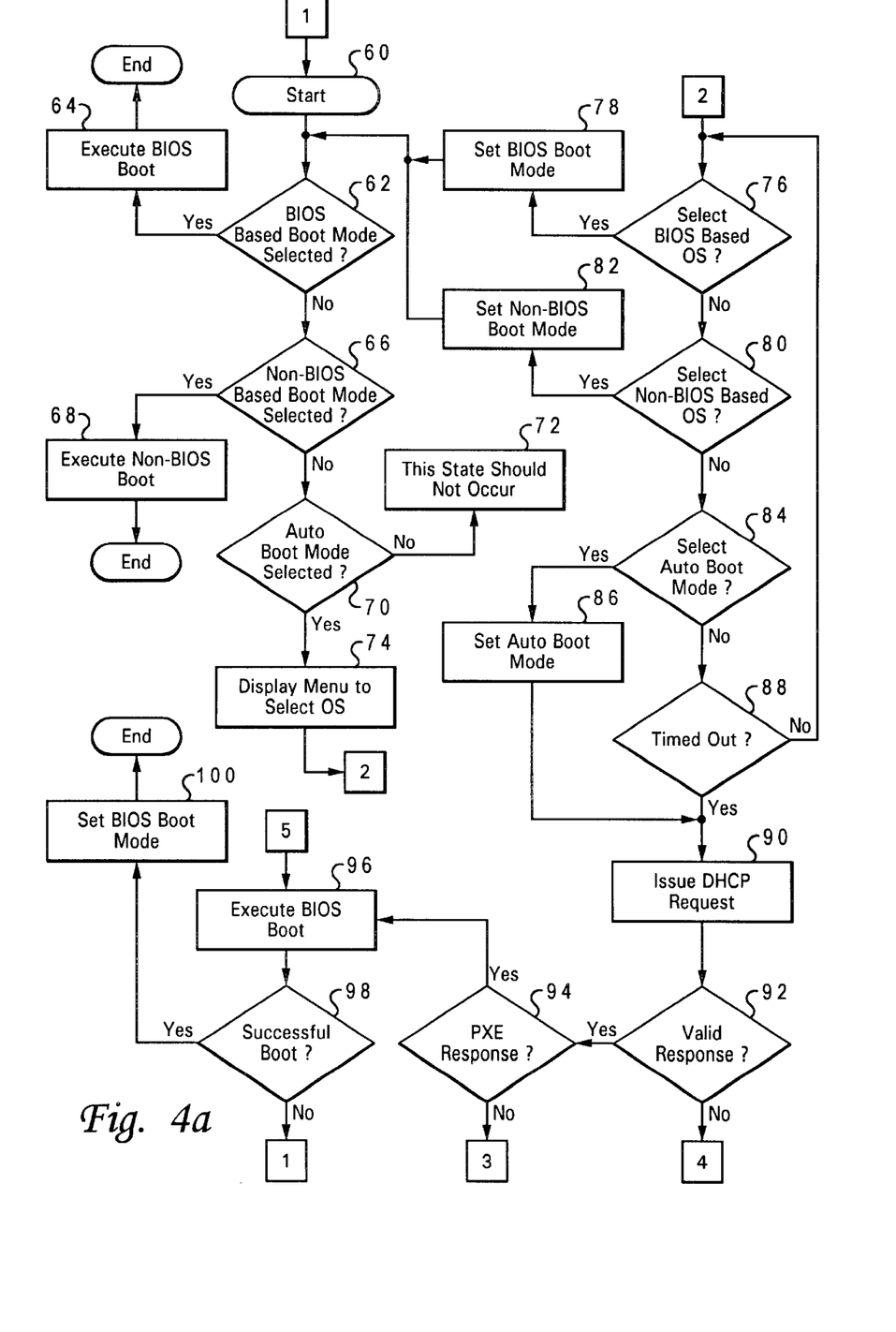
FIGS. 4a–4b illustrate a high level logic flowchart of a process for configuring the boot process of network computer upon initiation to a network.
Figure 4B:
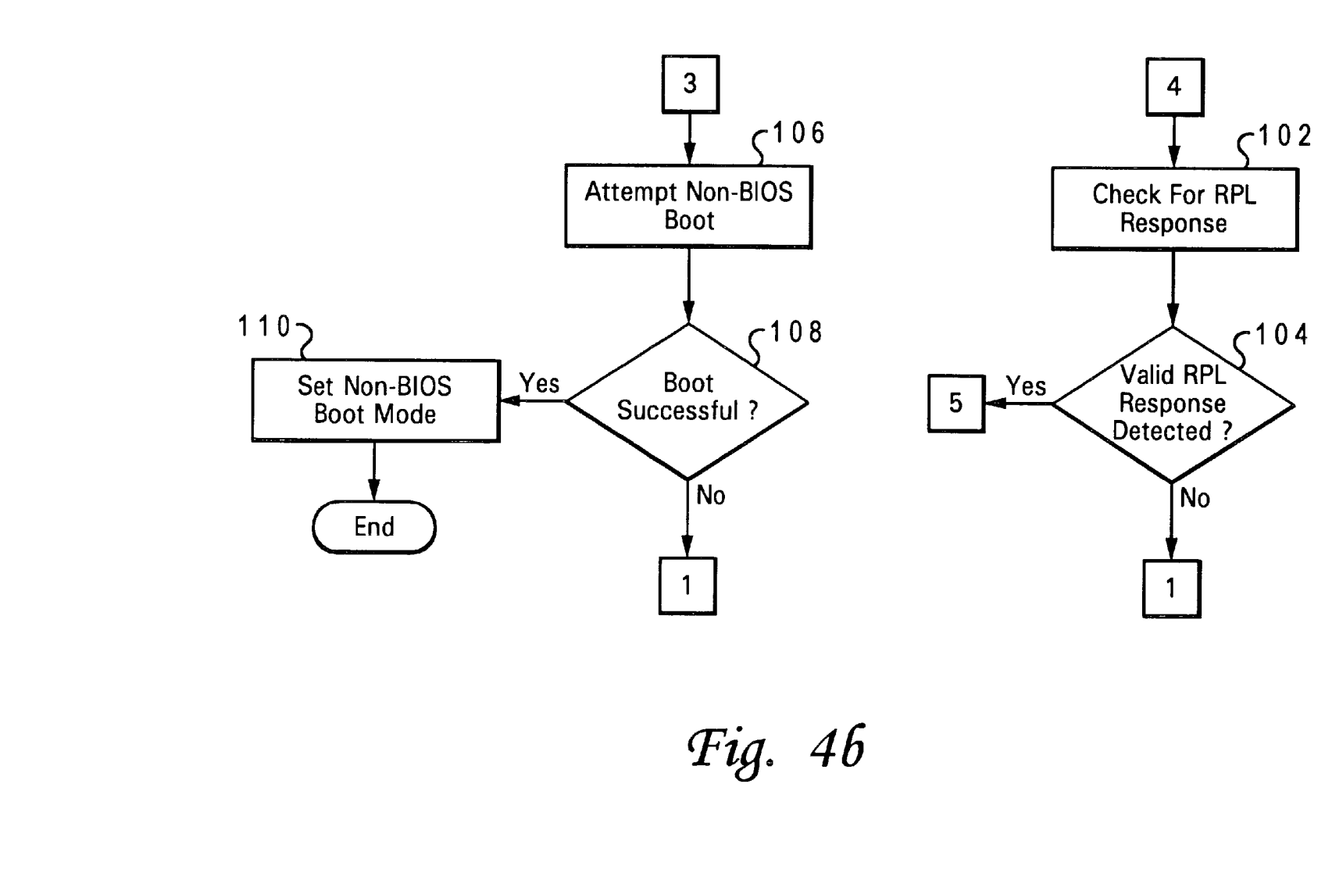

Referring now to FIG. 4a–4b, there is depicted a high level logic flowchart of a process for configuring the boot process of network computer upon initiation to a network. As illustrated, the process starts at block 60. The initial process is controlled by a non-BIOS boot program. Thereafter, the process proceeds to block 62. Block 62 depicts a determination as to whether or not a BIOS based boot is selected. If a BIOS based boot is selected, the process passes to block 64. Block 64 illustrates executing a BIOS boot whereby a BIOS boot program is utilized to control the boot process and the current process ends. If a BIOS based boot is not selected, the process passes to block 66. Block 66 depicts a determination as to whether or not a non-BIOS based boot is selected. If a non-BIOS based boot is selected, the process passes to block 68. Block 68 illustrates executing a non-BIOS boot whereby a non-BIOS based boot program is utilized to control the boot process and the current process ends. If a non-BIOS based boot is not selected, the process passes to block 70. Block 70 depicts a determination as to whether or not the auto boot mode is selected. If the auto boot mode is selected, which should always be the case at block 70, a menu by which the user may select an OS is displayed, as illustrated at block 74. Preferably, the user may select a BIOS based OS, non-BIOS based OS, or auto boot mode in the menu.

Subsequently, block 74 depicts a determination as to whether or not a BIOS based OS is selected. If a BIOS based OS is selected, the process passes to block 78.

Block 78 illustrates setting the BIOS based boot mode as selected, whereafter the process passes to block 62. Otherwise, if a BIOS based OS is not selected, the process passes to block 80. Block 80 depicts a determination as to whether or not a non-BIOS based OS is selected. If a non-BIOS based OS is selected, the process passes to block 82. Block 82 illustrates setting the non-BIOS based boot mode as selected, whereafter the process passes to block 62. Otherwise, if a non-BIOS based OS is not selected, the process passes to block 84. Block 84 depicts a determination as to whether or not the auto boot mode is selected. If the auto boot mode is selected, then the process passes to block 86. Block 86 illustrates setting the auto boot mode as selected, whereafter the process passes to block 90. If the auto boot mode is not selected, the process passes to block 88. Block 88. Block 88 illustrates a determination as to whether or not the selection has timed out. If a selection has not been made in the menu after a particular time, the process moves on in auto mode to block 90. If a selection is not mode and the time has not run out, the process passes back to block 76.

Block 90 depicts issuing a DHCP request. Next, block 92 illustrates a determination as to whether or not a valid response has been returned. If a valid response has been returned, the process passes to block 94. Block 94 illustrates a determination as to whether or not a PXE response is returned. If a PXE response is returned, the process passes to block 96. Block 96 depicts executing a BIOS boot whereby a BIOS based boot program is executed. Thereafter, block 98 illustrates a determination as to whether or not a successful boot has been executed. If a successful boot has been executed, the process passes to block 100. Block 100 illustrates setting the BIOS boot mode, whereafter the process returns. If a successful boot has not been executed, the process passes to block 62.

Returning to block 94, if a PXE response is not returned, the process passes to block 106 of FIG. 4b. Block 106 depicts attempting a non-BIOS boot, whereby a non-BIOS boot program is executed. Next, block 108 illustrates a determination as to whether or not the non-BIOS boot was successful. If the non-BIOS based boot was successful, the process passes to block 110. Block 110 depicts setting the non-BIOS boot mode to selected, whereafter the process ends. If the non-BIOS based boot code was not successful, the process passes back to block 62 of FIG. 2a.

Returning to block 92, if a valid response is not received, the process passes to block 102 of FIG. 4b. Block 102 illustrates checking for an RPL response. Thereafter, block 104 depicts a determination as to whether or not a valid RPL response is returned. If a valid RPL response is returned, the process passes to block 96 of FIG. 2a. If a valid RPL response is not returned, the process passes to block 62 of FIG. 2a.

It is also important to note that, although the present invention has been described in the context of a fully functional computer system, those skilled in the art will appreciate that the mechanisms of the present invention are capable of being distributed as a program product in a variety of forms, and that the present invention applies equally regardless of the particular type of signal-bearing media utilized to actually carry out the distribution. Examples of signal-bearing media include, but are not limited to, recordable-type media such as floppy disks or CD ROMs and transmission-type media such as analogue or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for automatically configuring a boot process of a network computer initially connected within a network comprising at least one server, said method comprising the steps of:

broadcasting a request from a network computer to a network for an available server having a downloadable operating system that is executable with one of a plurality of bootstrap programs on said network computer, upon a first initiation of said network computer within said network;

gathering responses from said broadcasting indicating whether said server is available;

downloading an operating system that is executable by a selected bootstrap program from among said plurality of bootstrap programs available in said network computer;

executing said selected bootstrap program and said operating system; and storing said selected bootstrap program and an identity of said available server as boot process configuration settings in a nonvolatile storage of said network computer, in response to successful execution of said bootstrap program and said correlated operating system, such that aboot process of a network computer is automatically configured upon a first initiation thereof such that for subsequent initiations of said network computer within said network said selected bootstrap program and server provided operating system are already selected for said boot process of said network computer.

2. The method for automatically configuring a boot process of a network computer according to claim 1, said method further comprising the steps of:

allowing a user to select a preferred operating system for operating said network computer, upon a first initiation of said network computer within said network;

automatically storing a selected bootstrap program from said plurality of bootstrap programs as a boot process configuration setting in nonvolatile storage of said network computer, in response to a user selecting a preferred operating system, where said selected bootstrap program correlates with said preferred operating system; and only broadcasting a request from a network computer to a network for an available server, in response to a user not selecting a preferred operating system for operating said network computer.

3. The method for automatically configuring a boot process of a network computer according to claim 1, said step of broadcasting a request from a network computer to a network for an available server, upon a first initiation of said network computer within said network, further comprising the step of:

issuing a DHCP request to said network for an available server.

4. The method for automatically configuring a boot process of a network computer according to claim 1, said step of broadcasting a request from a network computer to a network for an available server, upon a first initiation of said network computer within said network, further comprising the step of:

issuing an RPL Find Frame request to said network for an available server.

5. The method for automatically configuring a boot process of a network computer according to claim 1, said step of gathering responses from said broadcasting indicating whether a server is available, further comprising the step of:

receiving a DHCP response to a DHCP request, where said DHCP response indicates that a server is available and the type of operating system utilized by said server.

6. The method for automatically configuring a boot process of a network computer according to claim 5, said step of receiving a DHCP response to a DHCP request, where said DHCP response indicates that a server is available and the type of operating system utilized by said server, further comprising the step of:

receiving a DHCP response indicating a server is available which utilizes either a BIOS based operating system or a non-BIOS based operating system.

7. The method for automatically configuring a boot process of a network computer according to claim 1, said step of gathering responses from said broadcasting indicating whether a server is available, further comprising the step of:

receiving a RPL Find Frame response to a RPL Find Frame request, where said RPL Find Frame response indicates that a server which utilizes a BIOS based operating system is available.

8. The method for automatically configuring a boot process of a network computer according to claim 1, said step of executing a selected bootstrap program from among a plurality of bootstrap programs available in said network computer, in response to gathering a response indicating an available server, where said selected bootstrap program correlates with an operating system of said available server, further comprising the step of:

executing a BIOS based bootstrap program, in response to gathering a response indicating an available server which utilizes a BIOS based operating system.

9. The method for automatically configuring a boot process of a network computer according to claim 8, said step of executing a selected bootstrap program from among a plurality of bootstrap programs available in said network computer, in response to gathering a response indicating an available server, where said selected bootstrap program correlates with an operating system of said available server, further comprising the step of:

executing a BIOS based bootstrap program, in response to gathering a DHCP response indicating an available server which utilizes a BIOS based operating system.

10. The method for automatically configuring a boot process of a network computer according to claim 8, said step of executing a selected bootstrap program from among a plurality of bootstrap programs available in said network computer, in response to gathering a response indicating an available server, where said selected bootstrap program correlates with an operating system of said available server, further comprising the step of:

executing a BIOS based bootstrap program, in response to gathering an RPL Find Frame response indicating an available server which utilizes a BIOS based operating system.

11. The method for automatically configuring a boot process of a network computer according to claim 1, said step of executing a selected bootstrap program from among a plurality of bootstrap programs available in said network computer, in response to gathering a response indicating an available server, where said selected bootstrap program correlates with an operating system of said available server, further comprising the step of:

executing a non-BIOS based bootstrap program, in response to gathering a response indicating an available server which utilizes a non-BIOS based operating system.

12. The method for automatically configuring a boot process of a network computer according to claim 1, said step of executing a selected bootstrap program from among a plurality of bootstrap programs available in said network computer, in response to gathering a response indicating an available server, where said selected bootstrap program correlates with an operating system of said available server, further comprising the step of:

executing a non-BIOS based bootstrap program, in response to gathering a DHCP response indicating an available server which utilizes a non-BIOS based operating system.

13. A system of automatically configuring a boot process of a network computer initially connected within a network comprising at least one server, said system comprising:

means for broadcasting a request from a network computer to a network for an available server having a downloadable operating system that is executable with one of a plurality of bootstrap programs on said network computer, upon a first initiation of said network computer within said network;

means for gathering responses from said broadcasting indicating whether said server is available;

means for downloading an operating system that is executable by a selected bootstrap program from among said plurality of bootstrap programs available in said network computer;

means for executing a selected bootstrap program and said operating system; and     means for storing said selected bootstrap program and an identity of said available server as boot process configuration settings in a nonvolatile storage of said network computer, in response to successful execution of said bootstrap program and said correlated operating system, such that a boot process of a network computer is automatically configured upon a first initiation thereof such that for subsequent initiations of said network computer within said network said bootstrap program and server provided operating system are already selected for said boot process of said network computer.

14. The system of automatically configuring a boot process of a network computer according to claim 13, said system further comprising:

means for allowing a user to select a preferred operating system for operating said network computer, upon a first initiation of said network computer within said network;

means for automatically storing a selected bootstrap program from said plurality of bootstrap programs as a boot process configuration setting in nonvolatile storage of said network computer, in response to a user selecting a preferred operating system, where said selected bootstrap program correlates with said preferred operating system; and     means for only broadcasting a request from a network computer to a network for an available server, in response to a user not selecting a preferred operating system for operating said network computer.

15. The system of automatically configuring a boot process of a network computer according to claim 13, said means for broadcasting a request from a network computer to a network for an available server, upon a first initiation of said network computer within said network, further comprising:

means for issuing a DHCP request to said network for an available server.

16. The system of automatically configuring a boot process of a network computer according to claim 13, said means for broadcasting a request from a network computer to a network for an available server, upon a first initiation of said network computer within said network, further comprising:

means for issuing an RPL Find Frame request to said network for an available server.

17. The system of automatically configuring a boot process of a network computer according to claim 13, said means for gathering responses from said broadcasting indicating whether a server is available, further comprising:

means for receiving a DHCP response to a DHCP request, where said DHCP response indicates that a server is available and the type of operating system utilized by said server.

18. The system of automatically configuring a boot process of a network computer according to claim 17, said means for receiving a DHCP response to a DHCP request, where said DHCP response indicates that a server is available and the type of operating system utilized by said server, further comprising:

means for receiving a DHCP response indicating a server is available which utilizes either a BIOS based operating system or a non-BIOS based operating system.

19. The system of automatically configuring a boot process of a network computer according to claim 13, said means for gathering responses from said broadcasting indicating whether a server is available, further comprising:

means for receiving a RPL Find Frame response to a RPL Find Frame request, where said RPL Find Frame response indicates that a server which utilizes a BIOS based operating system is available.

20. The system of automatically configuring a boot process of a network computer according to claim 13, said means for executing a selected bootstrap program from among a plurality of bootstrap programs available in said network computer, in response to gathering a response indicating an available server, where said selected bootstrap program correlates with an operating system of said available server, further comprising:

means for executing a BIOS based bootstrap program, in response to gathering a response indicating an available server which utilizes a BIOS based operating system.

21. The system of automatically configuring a boot process of a network computer according to claim 20, said means for executing a selected bootstrap program from among a plurality of bootstrap programs available in said network computer, in response to gathering a response indicating an available server, where said selected bootstrap program correlates with an operating system of said available server, further comprising:

means for executing a BIOS based bootstrap program, in response to gathering a DHCP response indicating an available server which utilizes a BIOS based operating system.

22. The system of automatically configuring a boot process of a network computer according to claim 20, said means for executing a selected bootstrap program from among a plurality of bootstrap programs available in said network computer, in response to gathering a response indicating an available server, where said selected bootstrap program correlates with an operating system of said available server, further comprising:

means for executing a BIOS based bootstrap program, in response to gathering a RPL Find Frame response indicating an available server which utilizes a BIOS based operating system.

23. The system of automatically configuring a boot process of a network computer according to claim 13, said means for executing a selected bootstrap program from among a plurality of bootstrap programs available in said network computer, in response to gathering a response indicating an available server, where said selected bootstrap program correlates with an operating system of said available server, further comprising:

means for executing a non-BIOS based bootstrap program, in response to gathering a response indicating an available server which utilizes a non-BIOS based operating system.

24. The system of automatically configuring a boot process of a network computer according to claim 23, said means for executing a selected bootstrap program from among a plurality of bootstrap programs available in said network computer, in response to gathering a response indicating an available server, where said selected bootstrap program correlates with an operating system of said available server, further comprising:

means for executing a non-BIOS based bootstrap program, in response to gathering a DHCP response indicating an available server which utilizes a non-BIOS based operating system.

\* \* \* \* \*